(12) United States Patent
Bunk et al.

(10) Patent No.: US 8,630,780 B2
(45) Date of Patent: Jan. 14, 2014

(54) BRAKE SYSTEM AND METHOD FOR OPERATING A BRAKE SYSTEM

(75) Inventors: Michael Bunk, Hampton VIC (AU); Konstantin Agapov, Abstatt (DE); Andreas Krautter, Steinheim (DE); Matthias Schanzenbach, Eberstadt (DE)

(73) Assignee: Robert Bosch GmbH, Stuttgart (DE)

( * ) Notice: Subject to any disclaimer, the term of this patent is extended or adjusted under 35 U.S.C. 154(b) by 393 days.

(21) Appl. No.: 12/990,828

(22) PCT Filed: Dec. 17, 2008

(86) PCT No.: PCT/EP2008/067756
§ 371 (c)(1),
(2), (4) Date: Feb. 28, 2011

(87) PCT Pub. No.: WO2009/141023
PCT Pub. Date: Nov. 26, 2009

(65) Prior Publication Data
US 2011/0166762 A1  Jul. 7, 2011

(30) Foreign Application Priority Data

May 20, 2008  (DE) .......................... 10 2008 001 868
Jun. 24, 2008  (DE) .......................... 10 2008 002 596

(51) Int. Cl.
*G06F 7/70*  (2006.01)
(52) U.S. Cl.
USPC .............................................. 701/70; 303/10

(58) Field of Classification Search
USPC ....................... 701/78, 70; 303/3, 10, 15, 155
See application file for complete search history.

(56) References Cited

U.S. PATENT DOCUMENTS

| 6,273,525 B1 | 8/2001 | Erban et al. |
| 6,339,738 B1 | 1/2002 | Kohl et al. |
| 6,389,349 B1 | 5/2002 | Hachtel |

FOREIGN PATENT DOCUMENTS

| CN | 1972831 | 5/2007 |
| DE | 196 32 311 | 2/1998 |
| DE | 197 12 889 | 10/1998 |
| DE | 198 28 553 | 2/2000 |
| JP | 8-127331 | 5/1996 |
| JP | 2000-79873 | 3/2000 |
| JP | 2000-203401 | 7/2000 |
| JP | 2005-59625 | 3/2005 |
| JP | 2007-216774 | 8/2007 |
| JP | 2008-18775 | 1/2008 |

OTHER PUBLICATIONS

International Search Report, PCT International Patent Application No. PCT/EP2008/067756, dated Apr. 8, 2009.

*Primary Examiner* — Khoi Tran
*Assistant Examiner* — Luke Huynh
(74) *Attorney, Agent, or Firm* — Kenyon & Kenyon LLP

(57) ABSTRACT

A method for controlling a brake system including receiving a braking signal for setting a braking action by the brake system, ascertaining a minimum rate of pressure increase in the brake system in order to effect the braking action within a predefined response time, and setting a pumping capacity of a pump of the brake system so that the pressure in the brake system increases in accordance with the minimum rate.

10 Claims, 4 Drawing Sheets

BRAKE SYSTEM AND METHOD FOR OPERATING A BRAKE SYSTEM

FIELD OF THE INVENTION

The present invention relates to a brake system and a method for operating a brake system.

BACKGROUND INFORMATION

In brake systems for motor vehicles, pumps are employed to enable active braking. The pumps are designed in such a way that they are able to pump sufficient brake fluid into the brake lines for any requested braking action in a predefined time period. One minimum demand comes from driver assistance or vehicle dynamics control systems, which initiate full braking or brief, individual braking of individual wheels to stabilize the vehicle in borderline situations. In this case a large volume of brake fluid must be pumped in a short time, so that a high rotational speed of the pumps is necessary.

However, high pump speed results in unacceptable noise generation.

During calibration, a rotational speed for the brake system is defined which represents a compromise between braking dynamics and noise generation. The compromise is determined on the basis of prior driving trials and empirical values from comparable brake systems. This results in considerable effort to find the compromise, as well as the risk of underestimating the requisite rotational speeds.

SUMMARY

An example method according to the present invention for controlling a brake system includes receiving a braking signal for setting a braking action by the brake system; ascertaining a minimum rate of pressure increase in the brake system in order to effect the braking action within a predefined response time; and setting a pumping capacity of a pump of the brake system so that the pressure in the brake system increases in accordance with the minimum rate.

The pumping capacity of the pump, for example the return pump, is adjusted to a currently requisite delivery requirement for brake fluid. The delivery requirement is estimated on the basis of a pressure change that is to be built up. The pumping capacity may be increased, for example linearly, with the demanded pressure change.

The noise level in the vehicle due to the pump may thus be kept low, except in the case of a strong braking action in an emergency.

One example embodiment of the method according to the present invention determines a present dead volume of the brake system and determines the pumping capacity as a function of the present dead volume.

When the pump first starts up it may occur, depending on the design of a brake circuit, that no braking action occurs at first. In addition, the braking action may lag behind the expected braking action of an intended setpoint pressure, or may not begin within a required response time. The dead volumes in the brake circuits first fill with brake fluid, without any pressure increase occurring. The design provides for taking account of the dead volumes in the brake circuits and increasing the pumping capacity of the pump, preferably until the dead volumes are filled.

One brake system according to the present invention includes a pump to build up a hydraulic pressure in a brake circuit to which at least one brake element is connected, and a control system to set a pumping capacity of the pump according to the example method according to the present invention.

BRIEF DESCRIPTION OF THE DRAWINGS

The present invention is explained below on the basis of preferred specific embodiments and the figures.

DETAILED DESCRIPTION OF EXAMPLE EMBODIMENTS

Figure 1:
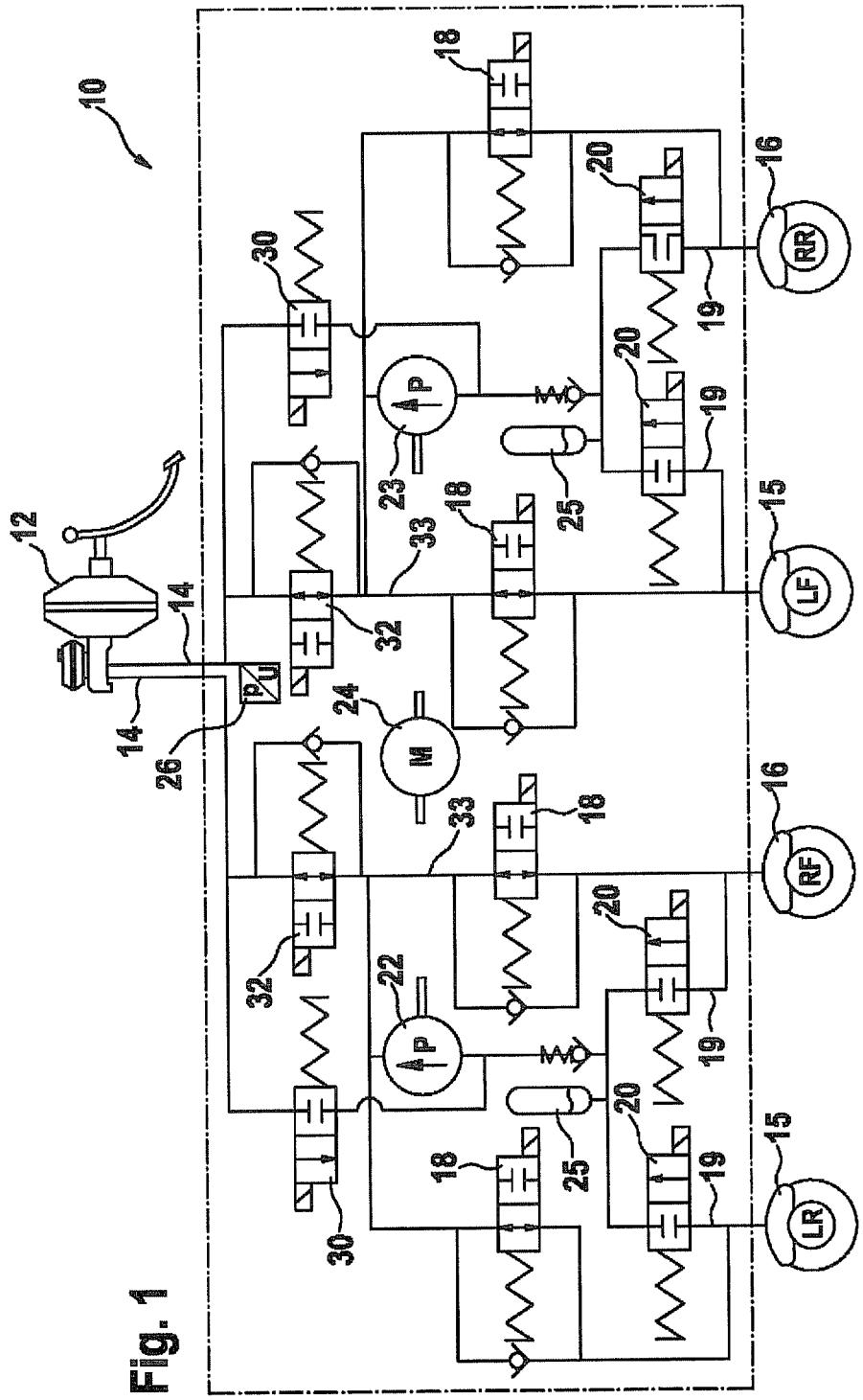
FIG. 1 shows a block diagram of a brake system.

FIG. 1 shows a schematic block diagram of a hydraulic brake system 10. Two mutually independent brake circuits are connected to a brake master cylinder 12. In each of the brake circuits, a main brake line 14 connects the brake master cylinder to two connected wheel brakes 15, 16. Wheel brakes 15, 16, on one of the main brake lines 14, may brake a front wheel and a diagonally opposite rear wheel, as depicted in FIG. 1. Besides this so-called X brake circuit split, however, any other division of the brake circuits is also possible.

Main brake line 14 branches before wheel brakes 15, 16. Situated in each of the branches is an inlet valve 18, which is open in a normal position. A return line 19 leads away from each of the wheel brakes 15, 16; these join in a common return line. Connected into return lines 19 are outlet valves 20, which are closed in their normal position.

A fluid reservoir 25 may be connected to one or both return lines 19. When wheel brakes 15, 16 are released, outlet valves 20 are opened. The brake fluid may drain away into fluid reservoir 25, whereby the hydraulic pressure acting on wheel brakes 15, 16 is reduced. Brake master cylinder 12 is able to draw the brake fluid from fluid reservoir 25 when outlet valve 20 and switchover valve 32 or a high pressure valve 30 are open. Otherwise the brake fluid is transported back via pump elements 22, 23. The brake fluid is thus available for another braking procedure.

Active braking or semi-active braking is made possible by motor-driven pump elements 22, 23. In active braking, pressure is built up in the brake circuits by pump elements 22, 23 alone. During semi-active braking, pump elements 22, 23 support the pressure buildup of operated master cylinder 12.

Pump element 22, 23 may be provided for each of the brake circuits. An output side of pump element 22, 23 is connected to a line 33 between switchover valve 32 and inlet valve 18. Pump element 22, 23 is able to pump brake fluid into line 33, in order to increase the pressure in line 33 and bring about a braking action of wheel brakes 15, 16.

Brake master cylinder 12 may be connected via a high pressure valve 30 to the suction side of pump elements 22, 23. High pressure valve 30 is closed in its normal position.

A switchover valve 32 is integrated into main brake line 14. Switchover valve 32 may connect the output side of pump element 22 to brake cylinder 12. In its normal position, switchover valve 32 is open. The flow of brake fluid through switchover valve 32 may be halted by applying a control signal. Typically a threshold value is set for a pressure difference between the inlet side and the outlet side of switchover valve 32, above which switchover valve 32 opens. The threshold value is set by the control signal.

A sensor 26 may be connected to main brake line 14, in order to detect the pressure in main brake line 14. Additional pressure sensors (not shown) may be integrated into wheel brakes 15, 16 or situated in the direct supply lines to wheel brakes 15, 16.

Figure 2:
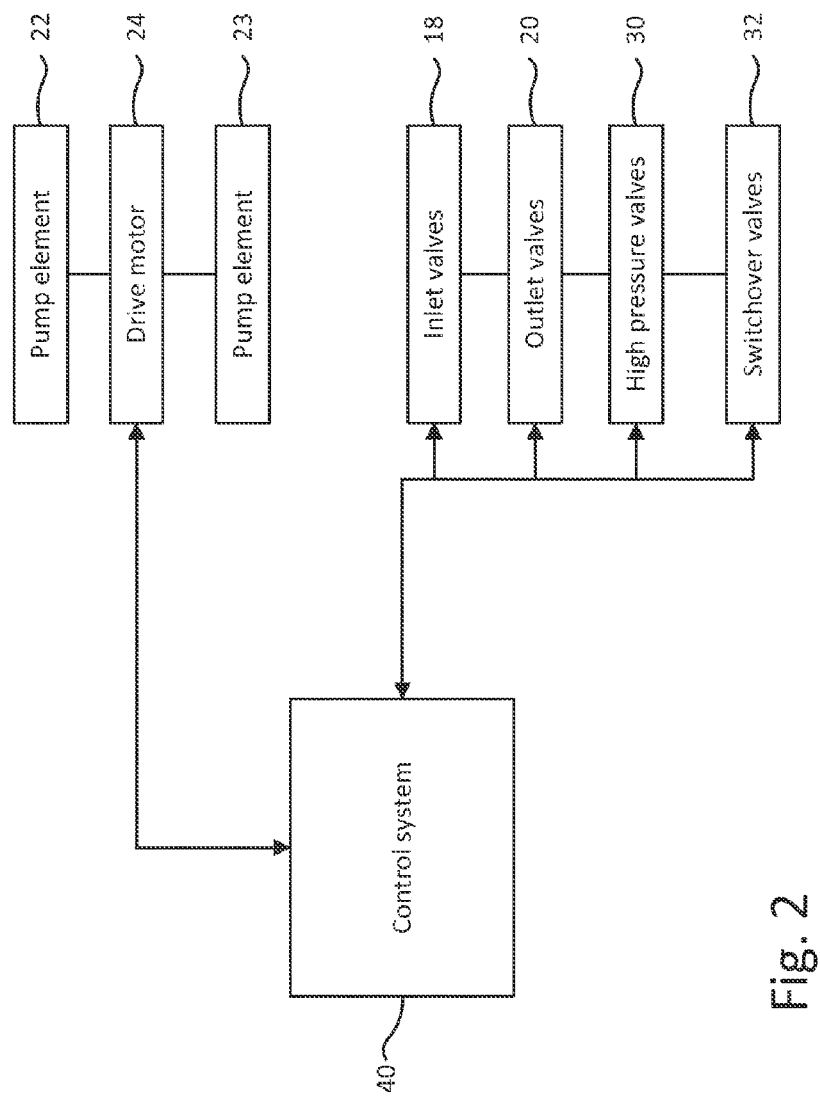
FIG. 2 shows a block diagram of the signal wiring of the brake system.

Pump elements 22, 23 are driven by a shared motor 24. Inlet valves 18, outlet valves 20, switchover valves 32 and high pressure valves 30 may be designed as solenoid valves. A control system 40 is connected to the valves in order to control inlet valves 18, outlet valves 20, switchover valves 32 and high pressure valves 30. In addition, control system 40 controls motor 24 for the pump elements. Control system 40 conveys a control signal to set the threshold value for switchover valve 32. The couplings of the control system, valves 18, 20, 30, 32 and motor 24 to transmit control signals are depicted in a block diagram in FIG. 2.

Rotational speed sensors may be connected to control system 40 in order to detect slippage or blocking of the wheels. Control system 40 is able to open or close the valves accordingly, and activate motor 24. The described brake system 10 makes standard braking, braking intervention by a driver assistance system, anti-wheel-lock control, driving slip, and/or vehicle dynamics control possible.

The demands on the brake system are diverse. Interventions in the driving behavior in moving traffic, for example in order to maintain a constant distance from a preceding vehicle, should proceed unnoticed by the driver. This requires exact metering of the braking force. If skidding of the vehicle is to be prevented by an active vehicle dynamics control system, rapid buildup and reduction of the braking action on the wheels is required. Rapid activation of the brake system requires a high pumping capacity of pump elements 22, 23. However, increasing the pumping capacity is also accompanied by increasing noise generation of pump elements 22, 23 and drive motor 24.

Figure 3:
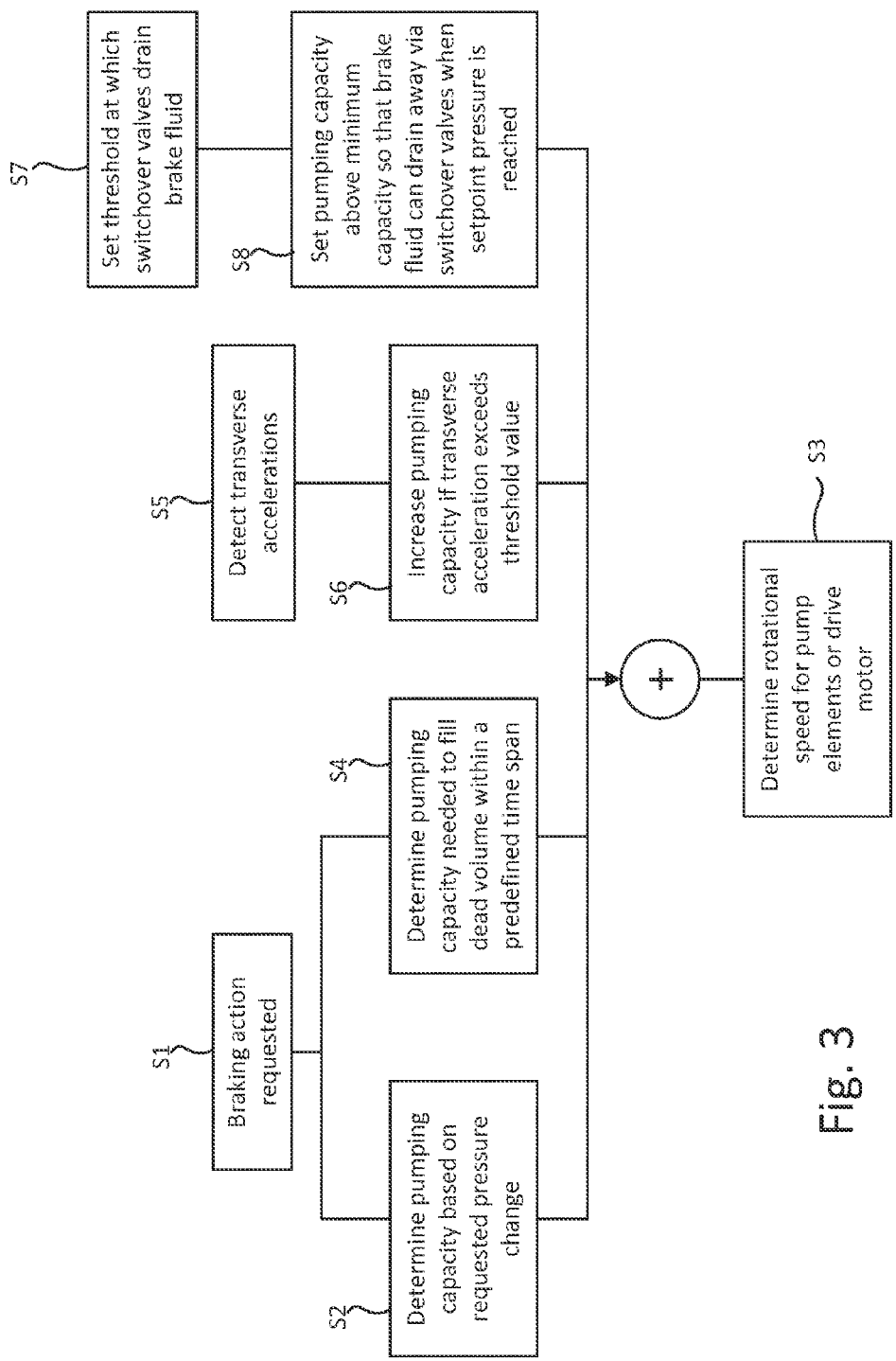
FIG. 3 shows a flow chart for elucidating the method for operating the brake system.

The specific embodiment described below controls drive motor 24 as a function of a requested braking action. FIG. 3 shows the sequence of the process as a flow chart.

In braking, a braking action is requested. The request may be conveyed by operating a brake pedal, by a corresponding control signal of a vehicle dynamics control system, a driver assistance system (adaptive cruise control), etc., to control system 40 (S1).

The braking signal may specify to what extent the braking action is to change. A measure of the appropriate pressure change in order to set the braking action may be contained directly in the braking signal. The braking signal may be a digital or an analog signal.

Control system 40 determines a pumping capacity q on the basis of the requested pressure change dp (S2). Pumping capacity q may be increased linearly with requested pressure change dp according to the following equation:

$$q = E\, dp/dt.$$

A response time dt predefines the time span within which the pressure change is to be built up. Response time dt may be firmly specified by control system 40, for example as a maximum permissible value. Response dt may also be, for example, the period in which the braking signals are transmitted.

In other embodiments, response time dt is specified by the braking signal. A driver assistance system may ascertain, for example, whether full braking is necessary, in which case an appropriately short response time dt is chosen. In such a case, a high rate of pressure change dp/dt is requested from pump system 22, 23, 24. On the other hand, if the vehicle is supposed to maintain a constant distance from the preceding vehicle in moving traffic, slow changes of pressure dp in the brake system are sufficient; in that case the braking signal may specify a high rate of change dt. Drive motor 24 of pump elements 22, 23 may be operated at low power, and the brake system is correspondingly quiet.

Figure 4:
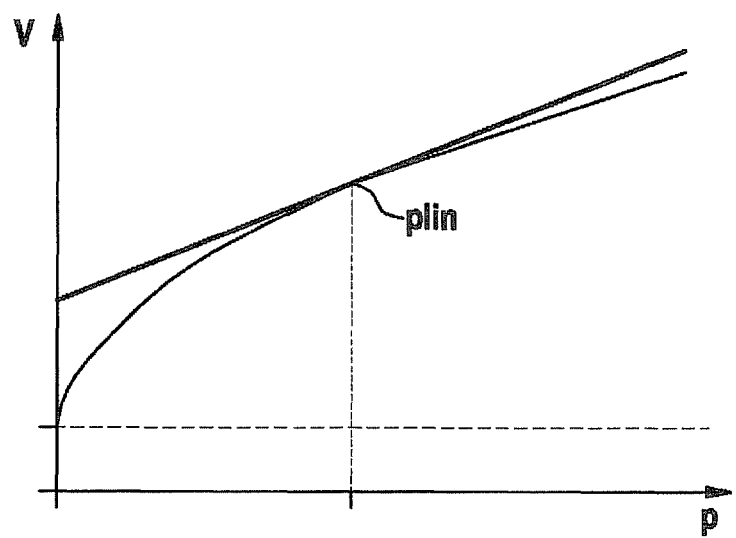
FIG. 4 shows a pressure-volume characteristic curve of the brake system.

Proportionality factor E is a value that is determined by the brake circuit. FIG. 4 shows a function of pressure p in wheel brake 15, 16 on the volume V of brake fluid pumped into wheel brakes 15, 16. Elasticity E may be defined as the quotients dV/dp around an operating point plin. A corresponding measurement of the pressure-volume characteristic of the brake circuit may be performed during installation of brake system 10, and the determined elasticity E is stored in control system 40.

In another embodiment it is provided to store the pressure-volume characteristic in control system 40. Elasticity E for an instantaneous actual pressure p0 is redetermined continuously from the pressure-volume curve.

Control system 40 ascertains a rotational speed n for pump elements 22, 23, or for motor 24 which drives pump elements 22, 23 (S3) from pumping capacity q. Rotational speed n may be determined according to the following formula:

$$n = q/(eV).$$

The efficiency e of pump elements 22, 23 and the pumped volume V per pumping cycle of pump elements 22, 23 are taken into account. If different rotational speeds n are ascertained for a plurality of brake circuits of pump elements 22, 23 which are connected to the same motor 24, the greatest of the ascertained rotational speeds n is preferably selected.

The linear increase of pumping capacity q or of rotational speed n may occur in a plurality of discrete steps, for example four or more steps. Alternatively, pumping capacity q or rotational speed n may be increased continuously.

Another specific embodiment refines the previous specific embodiment. Dead volumes V0 are allowed for in the brake circuits when determining pumping capacity q. When building up the pressure by pumping in brake fluid, a dead volume V0 is filled first. Hence, a pressure increase may not occur at the beginning of pumping, or may lag behind the requested response time dt.

An example of a dead volume V0 may be air play caused by a gap between the brake lining and the brake disk; under certain circumstances the volume of the valves, main brake line 14, return line 19, etc., may also contribute to the air play. Furthermore, the volume of the brake circuit increases when brake pistons of wheel brakes 15, 16 are pressed outward under the effect of the hydraulic pressure, which also produces a non-linear behavior between pressure p and volume V that may be attributed to dead volume V0.

The dead volume V0 due to the air play may be ascertained for various operating conditions of the brake system in sequences of tests. The operating conditions include, for example, the operating temperature and the transverse acceleration. The ascertained tables, characteristics, etc., are stored in control system 40.

Control system 40 determines a pumping capacity q that is necessary to fill dead volume V0 within a predefined time span T (S4). Predefined time span T may be equal to response time dt. Pumping capacity q is found according to:

$$q = E\, dp/dt + V0/T.$$

Rotational speed n is determined as in the previous specific embodiment, based on the pumping capacity q.

Figure 5:
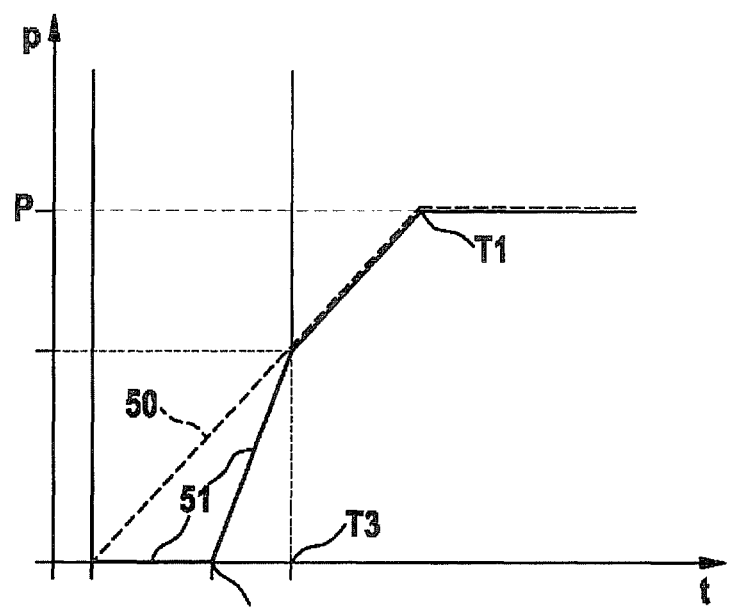
FIG. 5 shows an illustration of the pressure buildup during active braking.

FIG. 5 shows the change of pressure p over time t for the described specific embodiment. The rise of pressure p is supposed to be increased over time t in accordance with dashed line 50, until setpoint pressure P is reached. Pressure p may be increased according to the time-dependent setpoint pressure, i.e., along dashed line 50, if only a negligible dead volume V0 or none is present in the brake circuit.

Pressure p builds up until a point in time T1, at which a setpoint pressure P is reached. Continuous line 51 illustrates the behavior when a dead volume V0 is present. No pressure increase occurs until a point in time T2, because dead volume V0 is being filled. Pressure p rises after that. Due to the increase in pumping capacity q by V0/T, a dynamic in the pressure buildup is reached that corresponds to a brake system without a dead volume V0.

Another specific embodiment takes dead volume V0 indirectly into account. The pressure-volume characteristic according to FIG. 4 for the brake circuit is stored in control system 40. The function may be defined in the form of a table, a characteristic curve, or an adapted polynomial.

Control system 40 receives the braking signal, in which the current setpoint pressure to be attained is specified. The actual pressure P0 in wheel brakes 15, 16 is determined using the pressure sensors, or is estimated by control system 40 on the basis of a model. Based on the stored pressure-volume function, the actual pressure P0, and the current setpoint pressure to be attained, a volume V1 of brake fluid is determined which, when pumped into line 33, raises the instantaneous pressure from actual pressure P0 to the instantaneous setpoint pressure. The pumping capacity q is determined as follows:

$$q = E\, dp/dt + V1/T.$$

Rotational speed n is determined as in the previous specific embodiments, based on the pumping capacity q.

Another specific embodiment provides a setting reserve qr for high dynamics when braking.

A transverse acceleration sensor detects acceleration values that occur perpendicularly to the direction of travel (S5). Such acceleration typically occurs due to the centrifugal force when driving around a curve.

If the transverse acceleration exceeds a threshold value, pumping capacity q is increased (S6). The increase qr may be proportional to the detected transverse acceleration. The reason for the additional pumping capacity qr is that if the transverse acceleration increases further above a second threshold value, an active vehicle dynamics control system is triggered and the vehicle is stabilized by selective braking of the wheels. To ensure that the vehicle dynamics control system continues to be triggered quickly, pumping capacity q is increased by the amount of setting reserve qr as a precaution.

In addition to the transverse acceleration, the vehicle speed, distance from the vehicle ahead, recognition of a red light by an image recognition system, etc., may contribute to an increase in pumping capacity q.

The characteristic curves, in particular the pressure-volume characteristic, are subject to fluctuations during operation. As a result, the braking action may only be set or metered within a tolerance range. In the case of one-time braking maneuvers or short-term stabilizing braking maneuvers that monitor the braking action through control loops, the fluctuations may be ignored. In the case of steady braking or repeated braking in order to set a defined speed of a vehicle or a defined distance from a preceding vehicle, greater precision and greater repeat precision may be required.

The specific embodiment described below utilizes switchover valves 32 in the brake circuit for this purpose. Using actuating signals, switchover valves 32 may be set to a threshold value at which brake fluid may drain from line 33 (S7). The switchover valves are used to set a desired pressure in wheel brakes 15, 16 by setting the threshold value to the desired pressure. Pumping capacity q is intentionally kept at an excess increment qa above the minimum necessary pumping capacity q, so that brake fluid is able to drain away via switchover valves 32 when setpoint pressure P is reached (S8). In FIG. 5 the effect of switchover valves 32 begins, for example, at point in time T3. The threshold value of switchover valves 32 is raised continuously until setpoint pressure P is reached. This method makes it possible to reach setpoint pressure P0 using a defined dynamic.

The repeat precision of switchover valves 32 may depend on the flow through the switchover valve. The excess increment qa may therefore preferably be chosen so that the switchover valve exhibits sufficient repeat precision of the setpoint pressure at the excess flow of brake fluid.

In one specific embodiment, all four contributions described above are drawn upon to determine pumping capacity q:

$$q = E\, dp/dt + V1/T + qr + qa.$$

What is claimed is:

1. A method for controlling a brake system, comprising:
   receiving a braking signal for setting a braking action by the brake system;
   ascertaining a minimum rate of pressure increase in the brake system in order to effect the braking action within a predefined response time; and
   setting a pumping capacity of a pump of the brake system so that the pressure in the brake system increases in accordance with the minimum rate,
   wherein the pumping capacity is set as a function of the minimum rate of pressure increase.

2. The method as recited in claim 1, wherein the braking signal predefines the response time for the braking action.

3. The method as recited in claim 1, wherein the pumping capacity is a linear function of the minimum rate of pressure increase.

4. The method as recited in claim 1, wherein the braking signal predefines a setpoint pressure, a switchover valve is set to the predefined setpoint pressure, and the pumping capacity is set by the switchover valve as a function of a predefined flow when the predefined setpoint pressure is reached.

5. A method for controlling a brake system, comprising:
   receiving a braking signal for setting a braking action by the brake system;
   ascertaining a minimum rate of pressure increase in the brake system in order to effect the braking action within a predefined response time; and
   setting a pumping capacity of a pump of the brake system so that the pressure in the brake system increases in accordance with the minimum rate,
   wherein an instantaneous dead volume of the brake system is determined and the pumping capacity is determined as a function of a current dead volume.

6. The method as recited in claim 5, wherein the braking signal predefines the response time for the braking action, and the pumping capacity is set as a function of a quotient of the instantaneous dead volume and the response time.

7. The method as recited in claim 5, wherein the instantaneous dead volume of the brake system is read from a data memory of the brake system.

8. A method for controlling a brake system, comprising:
   receiving a braking signal for setting a braking action by the brake system;

ascertaining a minimum rate of pressure increase in the brake system in order to effect the braking action within a predefined response time; and setting a pumping capacity of a pump of the brake system so that the pressure in the brake system increases in accordance with the minimum rate, wherein at least one of a transverse acceleration and a velocity is detected, and the pumping capacity is increased when the at least one of the transverse acceleration and velocity increases.

9. A method for controlling a brake system, comprising:

receiving a braking signal for setting a braking action by the brake system;

ascertaining a minimum rate of pressure increase in the brake system in order to effect the braking action within a predefined response time; and setting a pumping capacity of a pump of the brake system so that the pressure in the brake system increases in accordance with the minimum rate, wherein the braking signal predefines a setpoint pressure, an instantaneous actual pressure in the brake system is determined, based on a characteristic of the brake system a volume of brake fluid is ascertained which will raise the pressure from an actual pressure to the setpoint pressure when pumped into the brake system, and the pumping capacity of the pump is set as a function of the volume ascertained and the predefined response time.

10. A brake system having:

a pump to build up a hydraulic pressure in a line to which at least one brake element is connected; and a control system to set a pumping capacity of the pump, the control system adapted to receive a brake signal for setting a braking action by the brake system, ascertain a minimum rate of pressure increase in the brake system in order to effect the braking action within a predefined response time, and set a pumping capacity of the pump so that the pressure in the brake system increases in accordance with the minimum rate, wherein the pumping capacity is set by the control system as a function of the minimum rate of pressure increase.

* * * * *

UNITED STATES PATENT AND TRADEMARK OFFICE
CERTIFICATE OF CORRECTION

PATENT NO. : 8,630,780 B2  Page 1 of 1
APPLICATION NO. : 12/990828
DATED : January 14, 2014
INVENTOR(S) : Bunk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 490 days.

Signed and Sealed this
Twenty-second Day of September, 2015

Michelle K. Lee
*Director of the United States Patent and Trademark Office*